US008261789B2

(12) United States Patent
Niknam et al.

(10) Patent No.: US 8,261,789 B2
(45) Date of Patent: Sep. 11, 2012

(54) TIRE TREAD HAVING THREE DIFFERENT SIPE TYPES

(75) Inventors: Fardad Niknam, Rochester Hills, MI (US); Hinnerk Kaiser, Hanover (DE); Matthew Lamb, Waxhaw, NC (US)

(73) Assignee: Continental Tire North America, Inc., Charlotte, NC (US)

( * ) Notice: Subject to any disclaimer, the term of this patent is extended or adjusted under 35 U.S.C. 154(b) by 974 days.

(21) Appl. No.: 12/289,017

(22) Filed: Oct. 17, 2008

(65) Prior Publication Data

US 2009/0107601 A1 Apr. 30, 2009

Related U.S. Application Data

(60) Provisional application No. 61/000,371, filed on Oct. 25, 2007.

(51) Int. Cl.
*B60C 11/12* (2006.01)
(52) U.S. Cl. ............ 152/209.2; 152/209.18; 152/DIG. 3
(58) Field of Classification Search ............... 152/209.2, 152/209.18, DIG. 3
See application file for complete search history.

(56) References Cited

U.S. PATENT DOCUMENTS

| | | | | |
|---|---|---|---|---|
| 4,327,792 A | * | 5/1982 | Landers | 152/209.2 |
| 5,526,860 A | * | 6/1996 | Minami | 152/209.18 |
| 2003/0094226 A1 | * | 5/2003 | Colombo et al. | 152/209.18 |
| 2008/0156405 A1 | * | 7/2008 | Tanabe | 152/209.18 |
| 2009/0218016 A1 | * | 9/2009 | Ducci | 152/209.1 |

FOREIGN PATENT DOCUMENTS

| | | | |
|---|---|---|---|
| EP | 1630004 A | | 3/2006 |
| JP | 07-186626 A | * | 7/1995 |
| JP | 2000-289413 A | * | 10/2000 |
| JP | 2007153104 A | | 6/2007 |
| WO | WO-2006/022120 A1 | * | 3/2006 |
| WO | WO 2007/099085 A | | 9/2007 |
| WO | WO-2007/099085 A1 | * | 9/2007 |

OTHER PUBLICATIONS

Machine translation for Japan 07-186626.*
Machine translation for Japan 2000-289413.*
PCT Search Report & Written Opinion in corresponding PCT/US2008/012022.

* cited by examiner

*Primary Examiner* — Steven D Maki
(74) *Attorney, Agent, or Firm* — Greenblum & Bernstein, P.L.C.

(57) ABSTRACT

A pneumatic tire (10) has an inner shoulder (11), an outer shoulder (12) and a tread (13) therebetween. The tread includes a plurality of circumferential grooves 30, 32, 34, 36 38) dividing the tread into a plurality of ribs including inner and outer shoulder ribs (14, 14'), inner and outer intermediate ribs (18, 18') between the shoulder ribs and a central rib (16) between the intermediate ribs. First sipes (20) are provided in the shoulder ribs and the central rib. Each first sipe has an interlocking shape. Second sipes (22) are provided in the intermediate ribs. Each second sipe has a shape different from that of the first sipes. Third sipes (24) are provided in the intermediate ribs. Each third sipe has a shape different from that of the first and second sipes.

19 Claims, 5 Drawing Sheets

TIRE TREAD HAVING THREE DIFFERENT SIPE TYPES

This application claims the benefit of the earlier filing date of U.S. Provisional Application No. 61/000,371, filed on Oct. 25, 2007, which is incorporated by reference herein in its entirety.

FIELD

The present invention relates to a tire tread with improved properties on dry, wet and wintery road surfaces and, more particularly, to a tire tread having all-weather performance making it especially suitable for sport-utility vehicles and light trucks.

BACKGROUND

Tire treads that have superior wet, dry and snow grip performance generally have increased rolling resistance that results in low efficiency, wear, chipping or chunking of the tire.

Thus, there is a need provide improved tire tread that maximizes the uses of tread pattern toward wet, dry, and winter performance without the trade-off on other tread performance, such as increased rolling resistance, increased chipping and chunking.

SUMMARY

An object of the invention is to fulfill the need referred to above. In accordance with the principles of the disclosed embodiments, this objective is obtained by providing a pneumatic tire having an inner shoulder, an outer shoulder, and a tread therebetween. The tread includes a plurality of circumferential grooves dividing the tread into a plurality of ribs including inner and outer shoulder ribs, inner and outer intermediate ribs between the shoulder ribs and a central rib between the intermediate ribs. First sipes are provided in the shoulder ribs and the central rib. Each first sipe has an interlocking shape. Second sipes are provided in the intermediate ribs. Each second sipe has a shape different from that of the first sipes. Third sipes are provided in the intermediate ribs. Each third sipe has a shape different from that of the first and second sipes.

In accordance with another aspect of the disclosed embodiment, a pneumatic tire has an inner shoulder, an outer shoulder, and a tread therebetween. The tread includes a plurality of circumferential grooves dividing the tread into a plurality of ribs including inner and outer shoulder ribs, inner and outer intermediate ribs between the shoulder ribs and a central rib between the intermediate ribs. First sipes, each having a generally sinusoidal shape, are provided in the shoulder ribs and the central rib. Second sipes, each having one of generally S-shape or Z-shape, are provided in the intermediate ribs. Third sipes are provided in the intermediate ribs. Each third sipe has a generally arc shape and being generally adjacent to a second sipe.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXAMPLE EMBODIMENT

Figure 1:
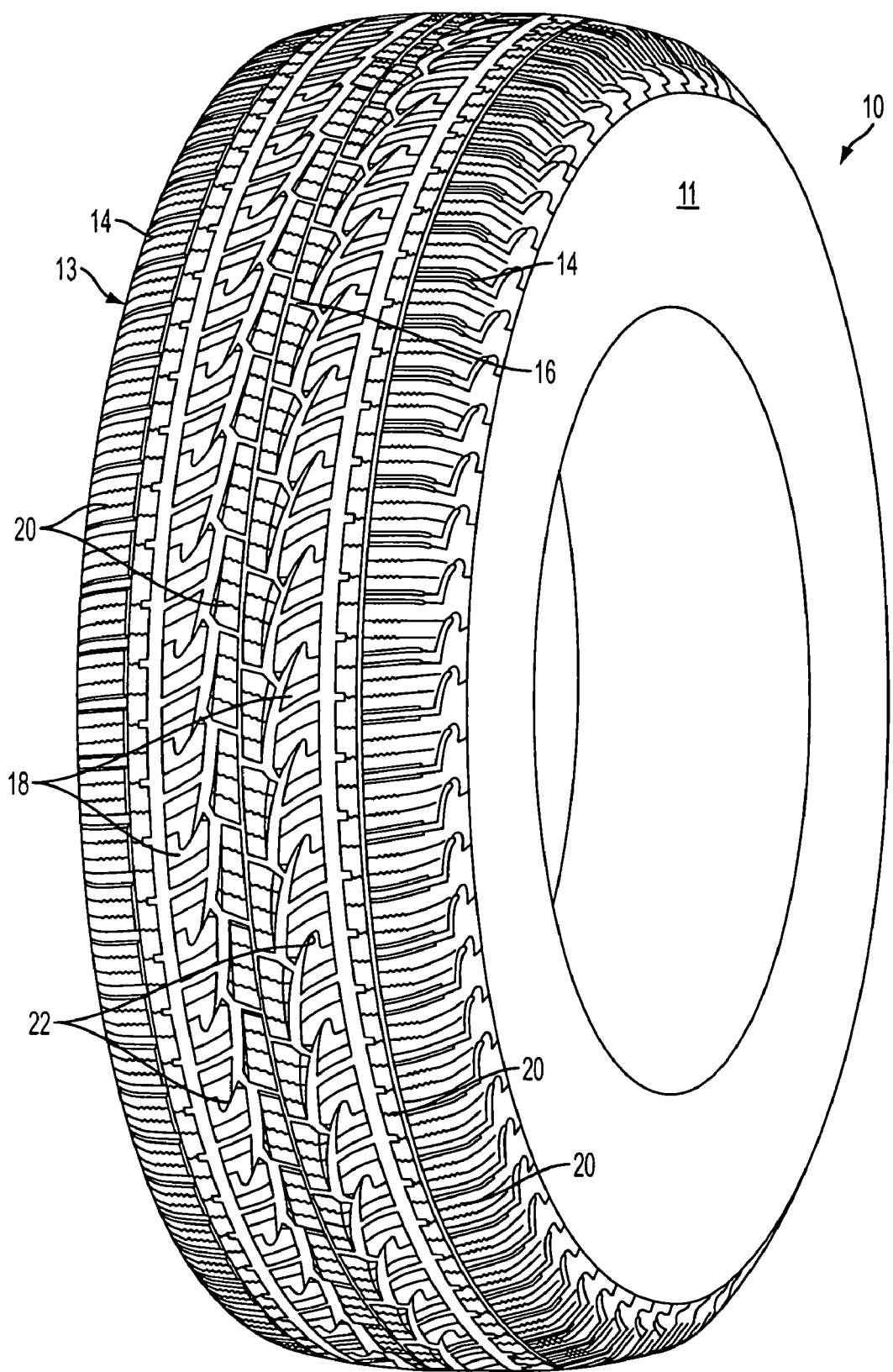
FIG. 1 shows a tire according to an embodiment in an inclined perspective.
Figure 2:
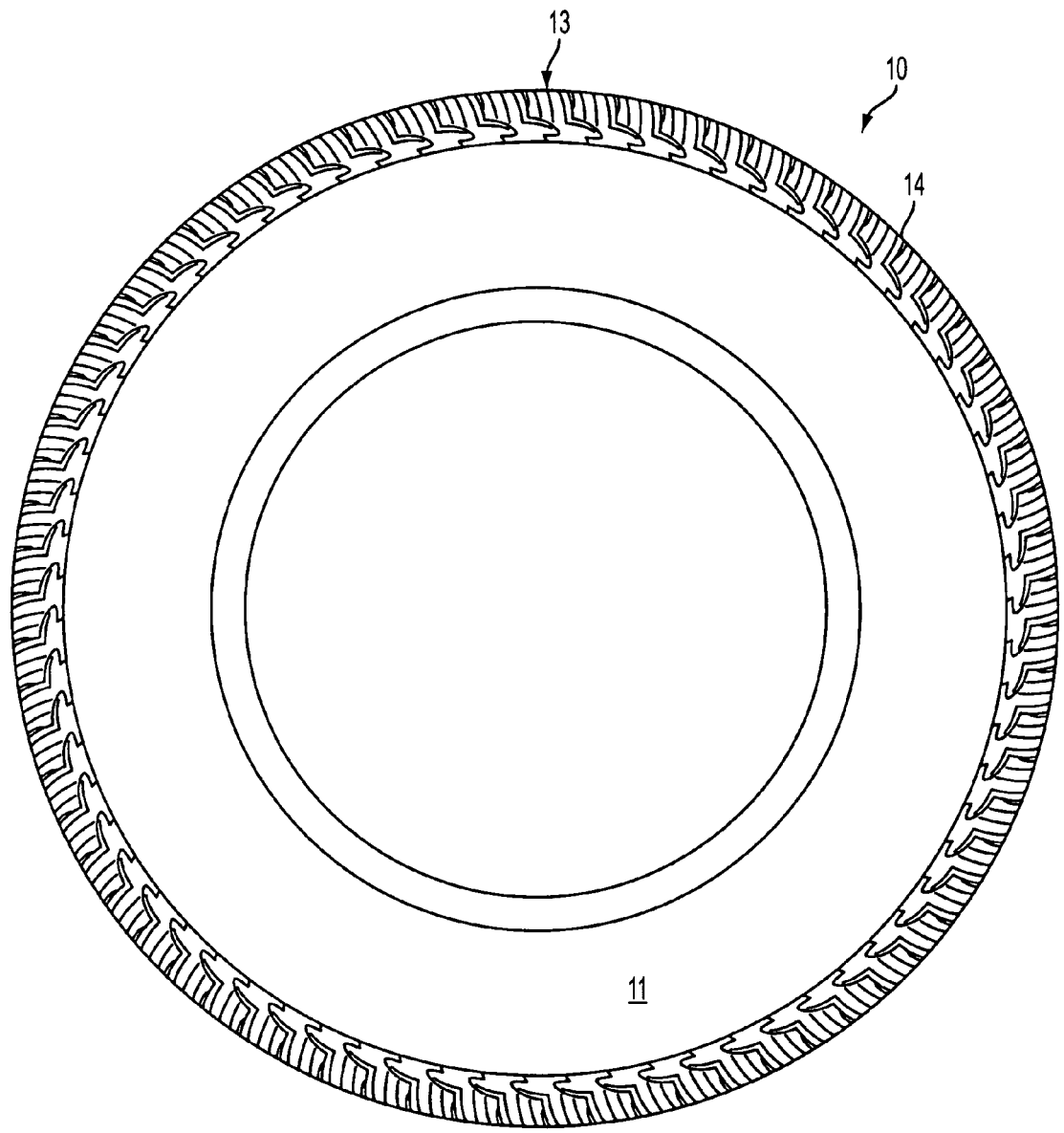
FIG. 2 shows the tire of FIG. 1 from the side, or in an axial view.
Figure 3:
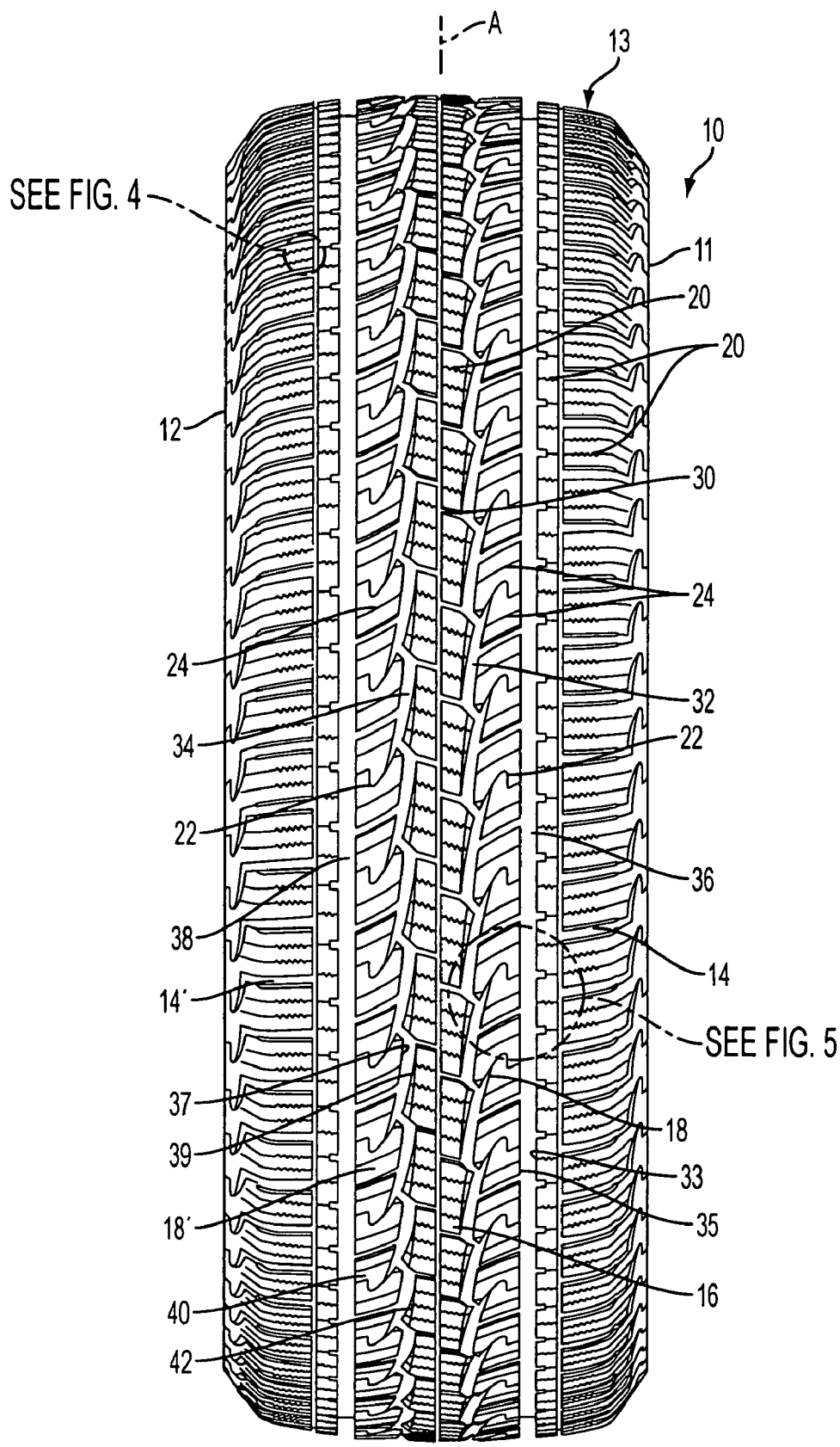
FIG. 3 shows the tire of FIG. 1 in a view from a radial direction.

With reference to FIGS. 1-3, pneumatic tire, generally shown at 10, is formed from inner shoulder 11, outer shoulder 12, and a tread, generally indicated at 13, extending therebetween. In this context, "inner" and "outer" are used merely for ease of description, it being understood that tire 10 can be mounted on a vehicle so that either inner shoulder 11 or outer shoulder 12 faces the vehicle's interior. Referring to FIG. 3, the tread 13 is composed of a center circumferential groove 30, a pair of intermediate circumferential grooves 32 and 34 disposed so that the center circumferential groove 30 is between the intermediate circumferential grooves 32, 34, and a pair of shoulder circumferential grooves 36 and 38 disposed so that the center circumferential groove 30 and the intermediate circumferential grooves 32 and 34 are between the shoulder circumferential grooves 36 and 38. In the embodiment, sidewalls, e.g., 33 and 35, of each of the grooves 30, 36 and 38 are substantially in a parallel relation, while sidewalls 37 and 39 of grooves 32 and 34 are generally curved. These circumferential grooves divide tread 13 into tread ribs including central rib 16, inner shoulder rib 14, outer shoulder rib 14' and intermediate ribs 18, 18' between central rib 16 and inner and outer shoulder ribs 14 and 14', respectively. Thus, the tread 13 is substantially symmetrical about axis A.

Figure 4:
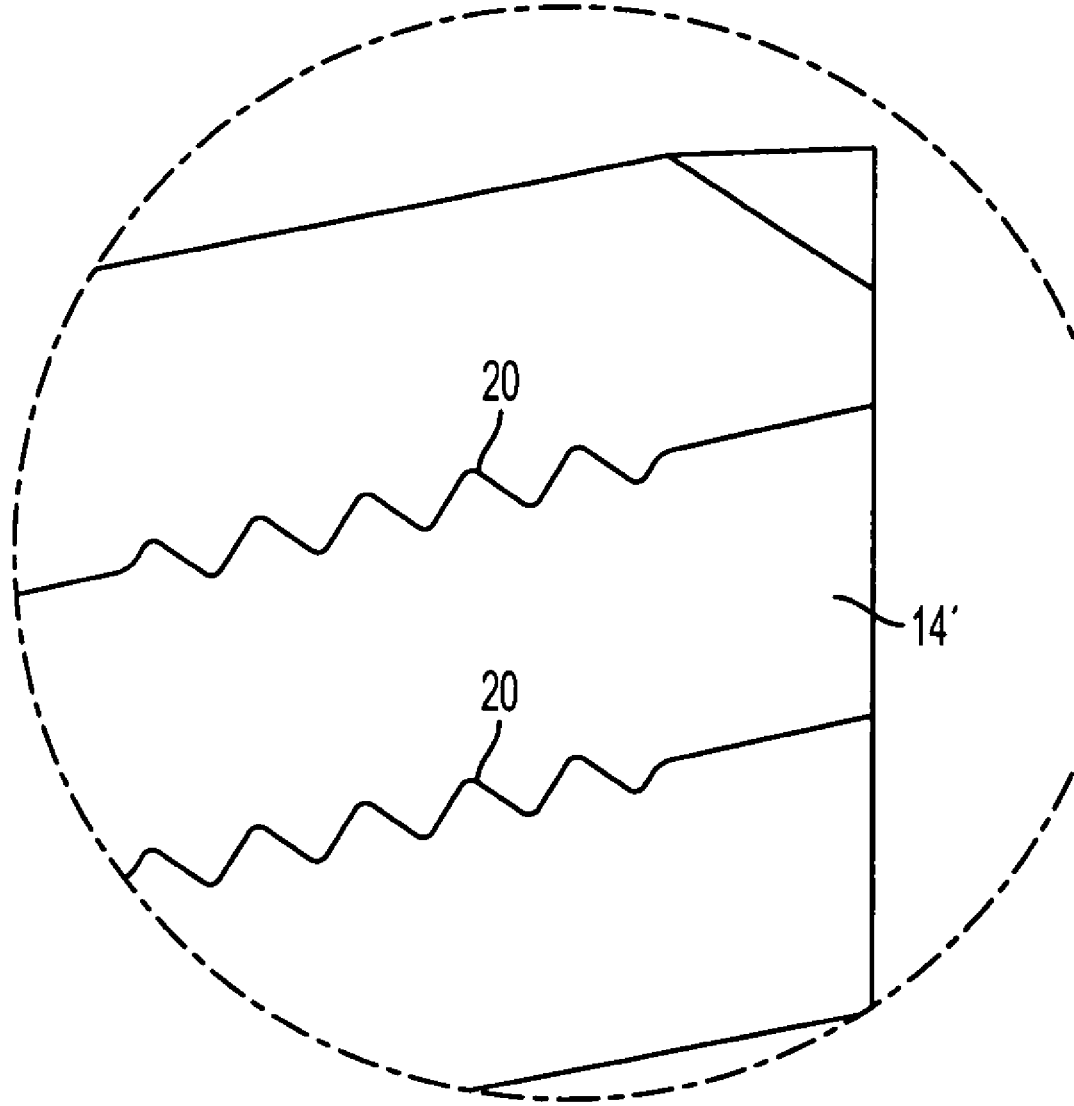
FIG. 4 shows an enlarged detail of the first sipes in a shoulder rib encircled at 4 in FIG. 3.
Figure 5:
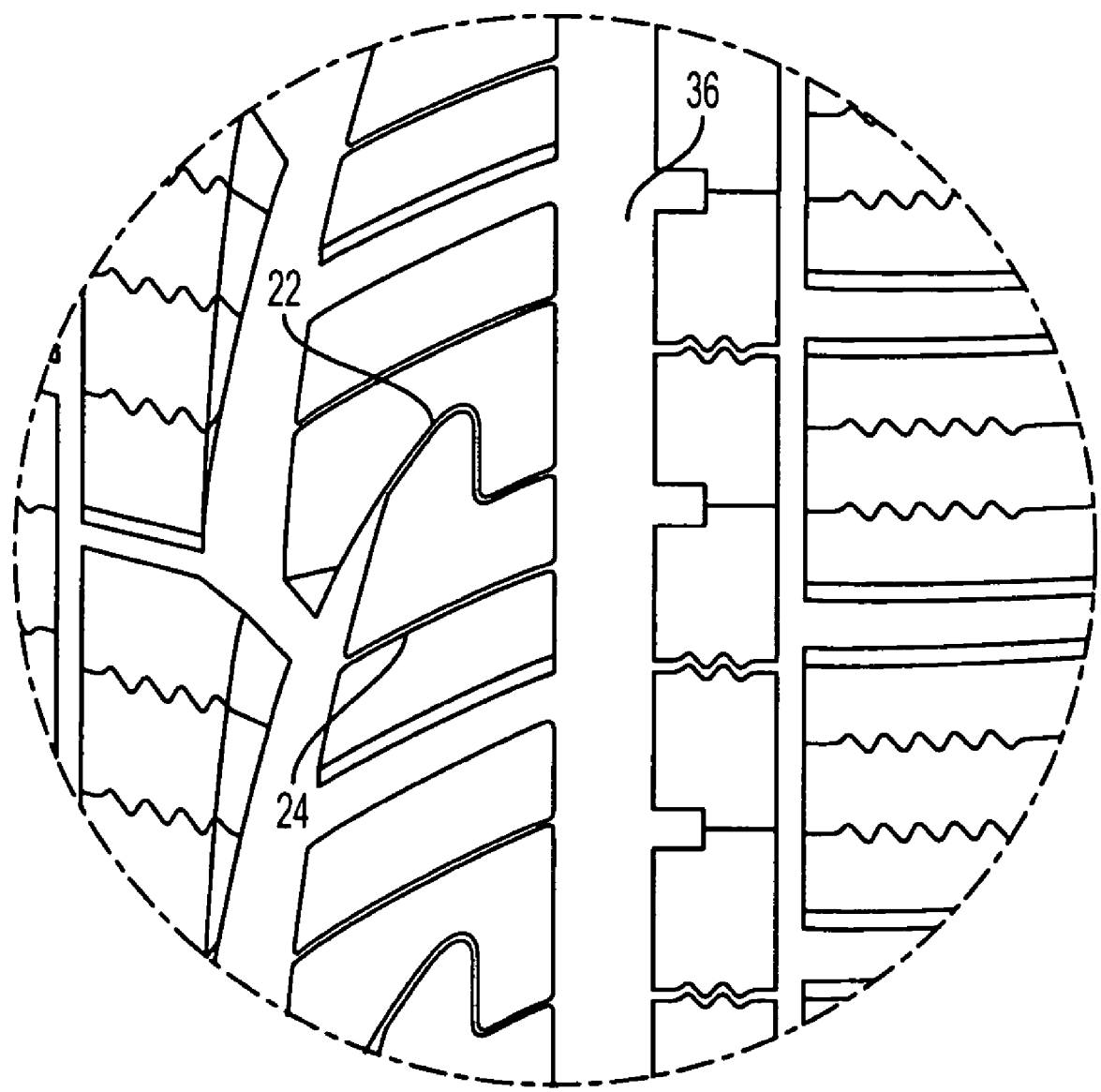
FIG. 5 shows an enlarged detail of the second, creative sipe, and third, curved sipe in an intermediate rib encircled at 5 in FIG. 3.

In the embodiment, the shoulder ribs 14, 14' and the central rib 16 include first or sipes 20 that are constructed and arranged to improve wet/winter tread performance. FIG. 4 shows an enlarged portion of the sipes 20 (here taken from a shoulder rib 14') which define an interlocking, preferably sinusoidal shape in the associated rib 14, 16, with an amplitude of less than about 0.5 cm. As used herein, the term "sipe" refers to a void in the tread 13 which closes up when in the footprint of the tire.

When driving in snow, as the sipes 20 travel through the beginning of the contact patch, each sipe 20 opens for a fraction of a second, with snow entering the thin pocket. Upon leaving the contact patch, the snow is captured by the interlocking sipes 20. Thus, when the same section of tread comes back around, the contact patch is met with snow captured in the sipes 20 from the previous rotation. Since snow has a greater friction force with itself than with rubber, the tire 10 sticks to the road better than a conventional tire.

Second sipes 22, are arranged in the intermediate ribs 18, 18', i.e., the ribs on both sides of the central rib 16. The second sipes 22 are creatively shaped, preferably resembling an S-shape or a Z-shape and provide more effective lengths on a higher stiffness level. Third sipes 24 of generally arc-shape are provided in the intermediate ribs 18, 18' and are arranged on each tread block 40 thereof so that a second sipe 22 is between a pair of the third sipes 24. The second sipes 22 together with the third sipes, provide the tread 13 with superior wet braking without compromising dry braking performance. Thus, the first, second and third sipes are of different shapes with respect to each other.

The central rib 16 and intermediate ribs 18, 18' have rather large tread blocks, 42 and 40, respectively, with approximately half the pitch number and approximately doubled block lengths compared to known tires used for similar purposes. The block length is the repeat of the tread pattern, i.e., the length of tread after which the pattern repeats itself. In the example shown, the pitch number for the central rib 16 and the intermediate ribs 18, 18' is 44 over the circumference of the tire. For the shoulder ribs 14, 14', the pitch number is 72. This increased block length in the central rib 16 and intermediate ribs 18, 18' improves braking on dry surfaces as well as provides resistance to chipping and chunking without trade-off with respect to other tire performances.

The use of the longer pitch sequence results in a very quiet tire while creating an interactive look of the pattern.

A triple sipe concept has been implemented on this tread pattern in order to maximize the usability of a single tread pattern for wet, dry/winter performance with no trade off on other performances such as rolling resistance and chipping and chunking. Accordingly, the tire tread 13 results in a significant improvement on wet, dry, and wintery road surfaces without compromising other performance characteristics. It also provides superior chipping and chunking resistance. The production name of this tire is Gabber HTS.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A pneumatic tire having an inner shoulder, an outer shoulder and a tread therebetween, the tread comprising:
   a plurality of circumferential grooves dividing the tread into a plurality of ribs including inner and outer shoulder ribs, inner and outer intermediate ribs between the shoulder ribs and a central rib between the intermediate ribs,
   first sipes, each having a substantially same interlocking shape, in the shoulder ribs and the central rib,
   second sipes, each having a shape that is one of generally S-shaped or generally Z-shape and that is different from that of the first sipes, in the intermediate ribs, and
   third sipes, each having a shape different from that of the first and second sipes, in the intermediate ribs,
   wherein each second sipe is adjacent two third sipes.

2. The tire of claim 1, wherein the interlocking shape of each first sipe is a generally sinusoidal shape.

3. The tire of claim 2, wherein an amplitude of each first sipe is less than about 0.5 cm.

4. The tire of claim 1, wherein each third sipe is of generally arc-shape.

5. The tire of claim 1, wherein the grooves include a center circumferential groove, a pair of intermediate circumferential grooves disposed so that the center circumferential groove is between the intermediate circumferential grooves, and a pair of shoulder circumferential grooves disposed so that the center circumferential groove and the intermediate circumferential grooves are between the shoulder circumferential grooves.

6. The tire of claim 5, wherein sidewalls defining the center circumferential groove and of each of the shoulder circumferential grooves are substantially in a parallel relation, and sidewalls defining each of the intermediate circumferential grooves are generally curved.

7. The tire of claim 1, wherein a pitch number of the central rib and the intermediate ribs is less than a pitch number of the shoulder ribs.

8. The tire of claim 7, wherein the pitch number of the central rib and each intermediate rib is 44 and the pitch number of each shoulder ribs is 72.

9. The tire of claim 1, wherein each second sipe is disposed between a pair of third sipes.

10. The tire of claim 1, wherein the intermediate rib comprises a plurality of tread blocks, and each tread block includes one second sipe disposed between a pair of third sipes.

11. The tire of claim 1, further comprising a straight circumferential groove extending through the central rib.

12. A pneumatic having an inner shoulder, an outer shoulder and a tread therebetween, the tread comprising:
   a plurality of circumferential grooves dividing the tread into a plurality of ribs including inner and outer shoulder ribs, inner and outer intermediate ribs between the shoulder ribs and a central rib between the intermediate ribs,
   first sipes, each having an interlocking shape, in the shoulder ribs and the central rib,
   second sipes, each having a shape different from that of the first sipes, in the intermediate ribs, and
   third sipes, each having a shape different from that of the first and second sipes, in the intermediate ribs,
   wherein the interlocking shape of each first sipe is a generally sinusoidal shape,
   wherein each second sipe is one of generally S-shape or generally Z-shape,
   wherein each third sipe is of generally arc-shape, and
   wherein in each tread block of each intermediate rib, a second sipe is disposed between a pair of third sipes.

13. A pneumatic tire having an inner shoulder, an outer shoulder and a tread therebetween, the tread comprising:
   a plurality of circumferential grooves dividing the tread into a plurality of ribs including inner and outer shoulder ribs, inner and outer intermediate ribs between the shoulder ribs and a central rib between the intermediate ribs,
   first sipes, each having a generally sinusoidal shape, in the shoulder ribs and the central rib,
   second sipes, each having one of generally S-shape or Z-shape, in the intermediate ribs, and
   third sipes in the intermediate ribs, each third sipe having a generally arc shape and being generally adjacent to a second sipe.

14. The tire of claim 13, wherein an amplitude of each first sipe is less than about 0.5 cm.

15. The tire of claim 13, wherein in each tread block of each intermediate rib, a second sipe is disposed between a pair of third sipes.

16. The tire of claim 13, wherein the grooves include a center circumferential groove, a pair of intermediate circumferential grooves disposed so that the center circumferential groove is between the intermediate circumferential grooves, and a pair of shoulder circumferential grooves disposed so that the center circumferential groove and the intermediate circumferential grooves are between the shoulder circumferential grooves.

17. The tire of claim 16, wherein sidewalls defining the center circumferential groove and of each of the shoulder circumferential grooves are substantially in a parallel relation, and sidewalls defining each of the intermediate circumferential grooves are generally curved.

18. The tire of claim 13, wherein a pitch number of the central rib and the intermediate ribs is less than a pitch number of the shoulder ribs.

19. The tire of claim 18, wherein the pitch number of the central rib and each intermediate rib is 44 and the pitch number of each shoulder ribs is 72.

* * * * *